United States Patent
Sutter et al.

[15] 3,669,416
[45] June 13, 1972

[54] METHOD AND AN APPARATUS FOR THE PRODUCTION OF DISPERSIONS OF DYESTUFFS

[72] Inventors: Fritz Sutter; Andreas Maier, both of Pratteln, Switzerland

[73] Assignee: Buss AG, Basel, Switzerland

[22] Filed: Nov. 23, 1970

[21] Appl. No.: 91,853

[30] Foreign Application Priority Data

Dec. 10, 1969  Switzerland ..................... 18481/69

[52] U.S. Cl. ......................................... 259/21, 259/5
[51] Int. Cl. ............................... B01f 7/08, B01f 15/02
[58] Field of Search ............. 259/5, 9, 10, 25, 26, 19, 21, 259/27, 40, 47, 102, 111, 112, 113, 114

[56] References Cited

UNITED STATES PATENTS

| | | | |
|---|---|---|---|
| 3,130,070 | 4/1964 | Potters et al. | 259/9 X |
| 3,347,528 | 10/1967 | List et al. | 259/10 X |
| 3,572,647 | 3/1971 | Staheli | 259/25 |
| 3,583,679 | 6/1971 | Godley | 259/5 |

FOREIGN PATENTS OR APPLICATIONS 765,486  1/1957  Great Britain ........................... 259/9

*Primary Examiner*—Walter A. Scheel
*Assistant Examiner*—Philip R. Coe
*Attorney*—Abraham A. Saffitz

[57] ABSTRACT

The present invention relates to a method for the production of dispersions of dyestuffs, in which the initial ingredients are fed individually and at different locations and stages into a continuously operating mixing and kneading machine and are processed therein. The dyestuff pigments are first mixed and degassed with slight heating whereafter they are conveyed in sliding motion into the apertures of the mixing and kneading machine and in such a manner that the material falls into the machine adjacent the periphery of the cross-section of the filling aperture leaving in the center, a free space for the exhaustion of gas. In addition, the invention relates to an apparatus for carrying out this method comprising a continuously operable mixing and kneading machine, having a rotatable and simultaneously oscillatable shaft with worm blades, said machine being provided with spatially separated filling apertures, a heatable conveyor worm and a drop chute for feeding dyestuff pigments, the said drop chute having conical enlargements at its upper and lower end and a downwardly open slide cone having a central upwardly directed exhaust pipe, which is provided in the end region of the lower conical enlargement.

4 Claims, 3 Drawing Figures

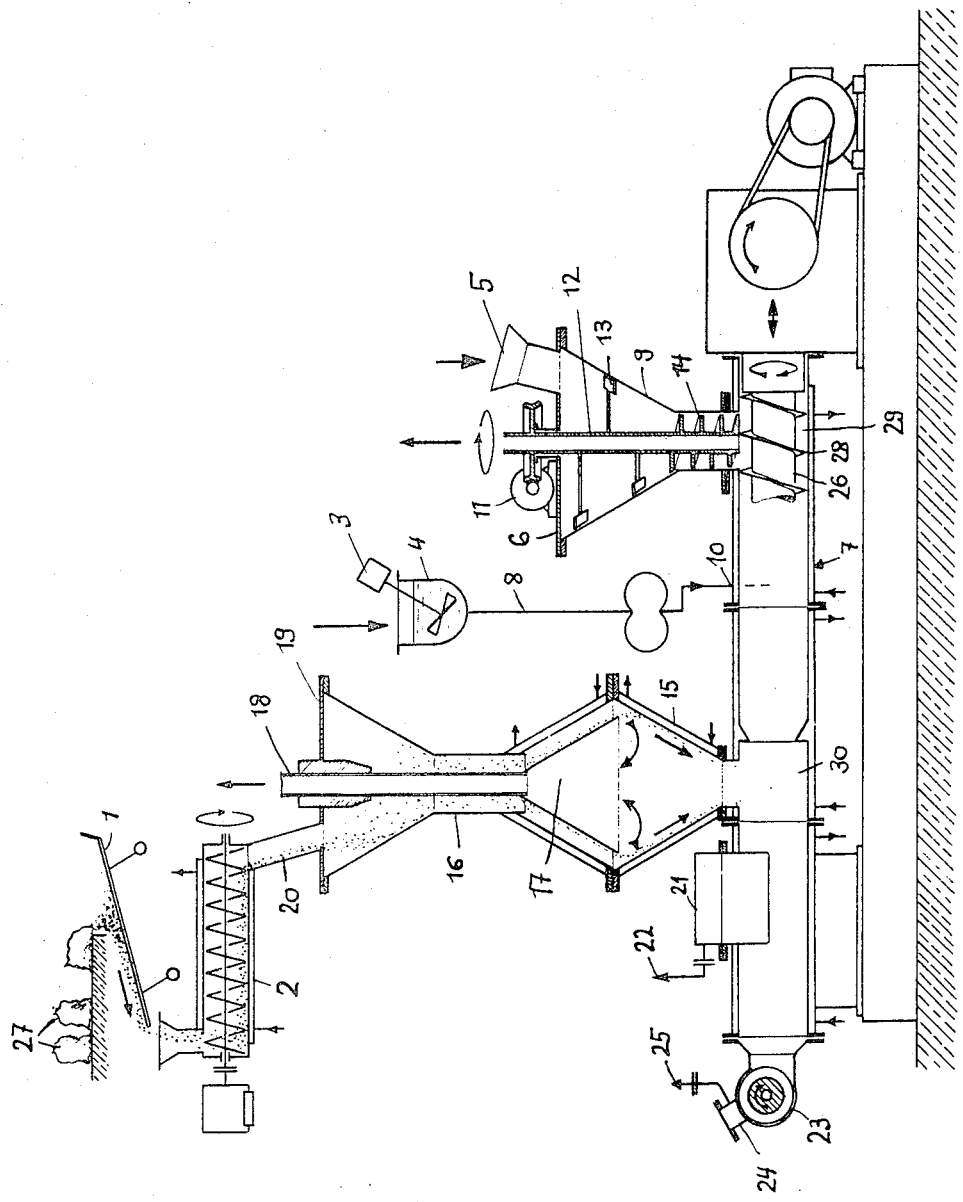

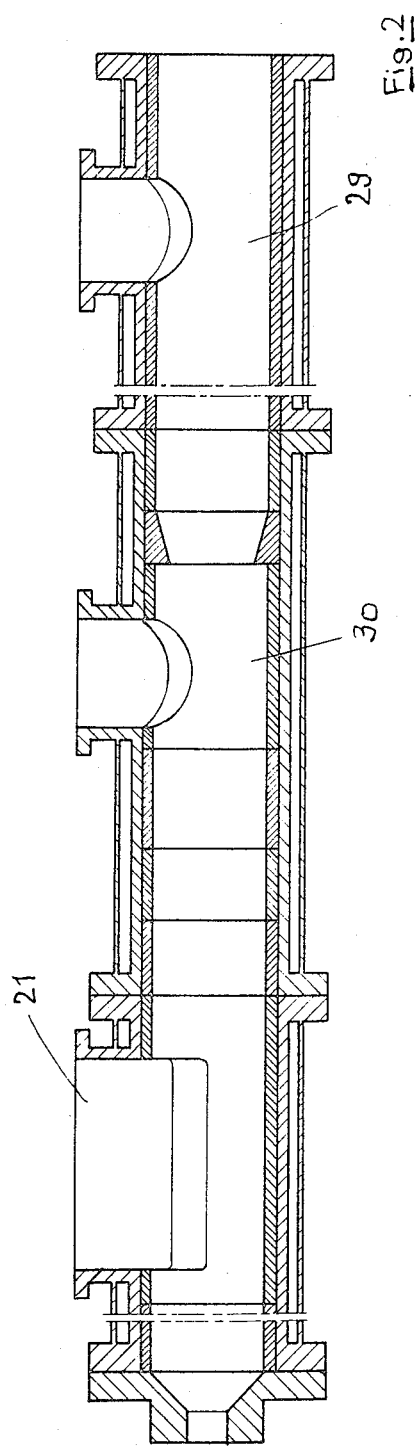
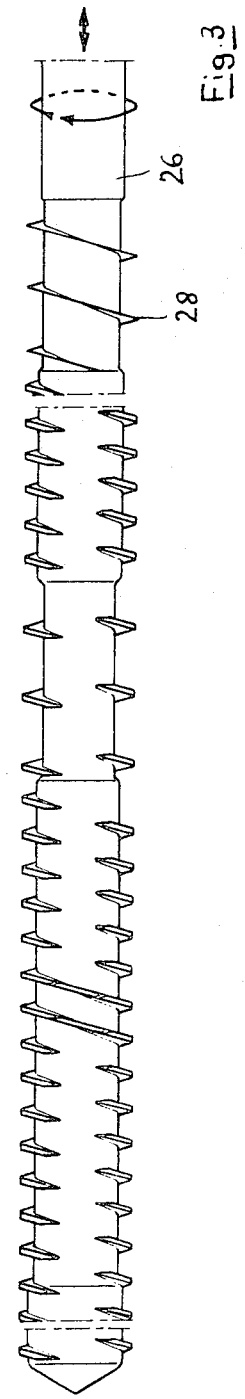

METHOD AND AN APPARATUS FOR THE PRODUCTION OF DISPERSIONS OF DYESTUFFS

In addition to the traditional and intermittently operating methods for the production of dispersions of dyestuffs, employing known apparatus, which include combinations of roller mechanisms, high speed mixers, trough kneaders, inner mixers, and ball-mills, continuously operating mixing and kneading machines have been introduced recently for making heavy dispersions.

A small or minimum power requirement is often regarded as a decisive technical and economical advantage but a short retention-time is also advantageous and this requires more power. These advantages result from the favorable high intensity of kneading per volume of kneading space, from the speed of the particles at the moment of highest kneading intensity, as well as from the lack of dead spaces and the positive course of the process of dispersion resulting therefrom.

The employment of such continuous operating mixing and kneading machines is emphasized in the literature, and it is recognized, correctly, that together with the quality, the suitability of the machine can be decisively influenced by the feeding and dosage of the material. Thus, it was suggested for example, that a rough but homogeneously distributed prior mixing of the components (dyestuff, carrier, dispersion aids and so on), be produced as the loading material and then to feed this into the inlet to the continuous mixing and kneading machine by means of uniformly constant feed devices. Most devices of this kind have, in addition, compensating intake and mixing characteristics, so that it is also possible to load the filling inlet with uniform charges at regularly spaced short intervals of, for example, 20–30 seconds, as long as the mixing and kneading chamber is sufficiently filled with the material to be charged.

Another known mixing technique consists in feeding a portion of the components in at the inlet of the mixing and kneading chamber and only when this proportion is mixed, compressed, kneaded, sintered or plasticized, are the remaining portions added, which permits separate degassing by vent openings or collars about the feed shaft or by employing hollow kneading teeth for feeding. The latter embodiments which employ hollow teeth and vent openings offer the advantage that they may be very simply and selectively mounted at the desirable positions of the casing of the kneader. Very often degassing via suitable apertures is combined with the feed of the remaining components because the concentrates still contain volatile component parts from the previous working stage or have absorbed moisture during transportation or have been in stock for some time.

Considerable difficulties are also encountered if, on the one hand, the distribution of those materials which should become volatile appears only irregularly or, on the other hand, the vapor pressure in the enclosed kneading chamber becomes so high that fine particles of the material are taken along in suspension into the vent openings for degassing.

It is an object of the invention to provide a new apparatus and method by which the disadvantages of inadequate mixing, inadequate degassing and inadequate ventilation are overcome so that the advantages of continuous operation can be utilized to the fullest even if one or more components have unfavorable characteristics due to irregularly distributed moisture due to storage. According to the invention there is provided a method for the production of dispersions of dyestuffs, in which the initial products are fed individually and at different places into a continuously operating mixing and kneading machine and are processed therein, wherein the dyestuff pigments are first mixed and pre-degassed under a slight heating whereafter they are conveyed in sliding motion into the regional filling apertures of the mixing and kneading machine and are fed therein in such a manner that the material falls into the machine adjacent the periphery of the cross-section of the filling aperture leaving in the center, a free space for the exhaustion of gas.

The apparatus of the invention comprises a continuously operable mixing and kneading machine, having a rotatable and reciprocating shaft, with worm blades, said machine being provided with spatially separated filling apertures, a heatable conveyor worm and a drop chute for feeding dyestuff pigments, the said drop chute having conical enlargements at its upper and lower ends, a downwardly open slide cone having a central upwardly directed exhaust pipe, being provided in the region of the lower enlargement.

A specific embodiment of the invention will now be described by way of example with reference to the accompanying drawings in which:

FIG. 1 is a schematic representation of the mixing and kneading apparatus of the invention;
FIG. 2 shows the kneading machine casing in section; and
FIG. 3 shows the kneading shaft in elevation.

As shown in FIG. 1, a mixing and kneading machine 7 is provided with three feed inlets, a hopper 9 having a lid 6 leading to the first feed inlet. The lid 6 has an inlet 5 for feeding the carrier or feed material into the hopper. A hollow shaft 12 is arranged axially in the hopper 9. Loosening members 13 are provided on the upper half of the shaft 12 and worm blades 14 are provided on the lower half of the shaft. The hollow shaft 12 is driven by an electric motor 11. A second inlet in the casing of the mixing and kneading machine 7 is formed by a hollow injector 10 which is connected by a pipe 8 leading from a container 4 containing a solvent. The dispersion aid is fed into this and mixed by a mixing device 3.

The third inlet 16 in the kneading machine is a tubular inlet fitted at its bottom with a tapered hopper 15 which is tapered conically towards its top and bottom. A tapered slide cone 17 is provided within the upper cone of the hopper 15, the apex of cone 17 being connected to the ventilating pipe 18 which extends beyond the upper edge of tubular inlet 16. However, the flared opening of the tubular inlet 16 is closed by a lid 19, the ventilating pipe 18 passes through a central portion of the lid 19. A conveying and pre-heating worm 2 arranged above the inlet 16 is connected by means of a pipe 20 an opening in the lid 19, the worm 2 being fed with dye pigments by means of a conveyor device 1.

A vent opening 21 and exhaust pipe 22 therefor are provided in the housing region of the delivery of the dye pigment between hopper 15 and transfer screw 23 which is shown at the extreme left of FIG. 1. This region is the metering zone of the housing. The transfer screw 23 is flanged onto the outlet of the mixing and kneading machine 7 and is provided with a vent opening 24 having exhaust pipe 25.

The method will be disclosed in greater detail below, black carbon being chosen as the pigment because carbon black is difficult to mix. Carbon black masterbatch as described in the applicant's U.S. Patent Application Ser. No. 776,418, filed Nov. 18, 1968 now U.S. Pat. No. 3,601,370 is mixed with a polymer as the carrier material into which a small amount of dispersing agent is added. This addition may be made to the polymer or to the solid substance of the pigment in the filling hopper or in the feed shaft, or as in the present case, as a molten paste fed directly into the kneading chamber.

The black carbon is delivered in sacks 27. During transport and storage, it is known that moisture in the black is distributed in a non-uniform manner e.g. the black carbon is too dry at the top of the sack and flows easily while at the bottom, it is too damp and forms lumps and the like.

The binder polymer is used as a fine powder; and has a low pouring density and a generally high gas and air content. Both the black carbon and the polymer are so fine that they tend to give off dust and cannot be completely de-aerated before entering the mixing and kneading device.

The polymer is fed into the hopper in the form of dust. The stirring shaft 12, which carries on its lower part blades 14 acts as a forcing feed screw and slightly pre-compresses the material.

The selected pitch of the blade takes into account the flow angle of the polymer and the rotational speed of the blades so that a "shooting" run of the material straight through the hopper is prevented. Furthermore the last spiral of the worm blades which projects into the kneading machine 7, is so inclined to the periphery of the hopper that the slightly precompressed material glides smoothly outwardly during the rotation of the stirring shaft.

The polymer is now drawn by the worm threads 28 of the kneading shaft 26 into the mixing chamber 29, the air and gas escaping from the polymer rearwardly. The escaping gases are vented upwardly through the hollow shaft 12. If the powder fed into the chamber does not need to be de-aerated, the hollow shaft can be closed by a plug or the hollow shaft may be used for feeding other dry or liquid components.

The dispersing agent, which is the second component, is fed through the hollow injector 10 and is kneaded with the polymer in the casing. Thereafter the mixture passes into a first decompression zone 30, where the carbon black is fed into the machine 7 from a gravity conveying device 1, into slowly rotating pre-heated screw 2, to partly de-aerate, partly dry, and uniformly mix the carbon black which drops through pipe 20 into the metering zone of the housing just behind the vent opening 21.

The discharge from the slowly rotating pre-heated screw is further de-aerated during its passage through the upwardly tapered drop chute 16. The apical angle of the cone 17 is selected to provide a smooth flow of the carbon black so that "shooting" flow, as well as plugging or bridging, is prevented. A similar flow-regulating function is provided by the tapered section above drop chute 16 to aid de-aeration in the drop chute. Escaping gases are indicated by the arrow in FIG. 1 placed at the upper end of the ventilating pipe 18. The feed of carbon black takes place along the periphery of cone 17 with the central portion of the cone and most of the central space in hopper 15 being open to permit gas to exhaust in the vertical direction opposite to the direction of flow of the carbon black.

If plugging or bridging of the cone 17 occurs, then the cone is vibrated in a manner known to prevent the flow from being impeded.

The moisture which is freed during kneading and dispersing of the carbon black in the machine 7 is led away through the exhaust pipe 18 and only a slight under-pressure differential is required vis-a-vis the pressure in the kneading chamber. An additional vent opening 21 is provided in the kneader casing and terminal casing opening 24 is provided at the entrance to the delivery worm 23 in order to remove residual volatile components.

We claim:

1. A method for continuously kneading and mixing dispersions of solid finely divided pigment, solid finely divided polymer binder and liquid dispersing agent, comprising:
   a. conveying said polymer binder through a hopper into a first feeding inlet in a worm-gear operating kneading and mixing machine, said hopper being fitted with a hollow de-aerating shaft in axial relationship thereto to de-aerate said binder while permitting smooth continuous flow into the worm of said kneading and mixing machine;
   b. conveying said liquid into said kneading machine from a container through an injection inlet downstream of said first feeding inlet to thereby mix smoothly and continuously with said polymer binder;
   c. conveying said pigment from a continuously operating slowly rotating heated worm conveyer by gravity through a drop chute fitted with a ventilating pipe and a biconical hopper below said drop chute, said drop chute serving to feed the pigment around its periphery and about the periphery of said biconical hopper, with the space in the center of the hopper serving as free space in communication with said ventilating pipe to exhaust gas from said pigment in a vertical direction opposite to the direction of flow of said pigment into the screw of said machine at a location downstream of the liquid injection inlet; and,
   d. venting the mixture of liquid, binder and pigment downstream of said pigment inlet through an exhaust pipe in the kneading machine and through degassing means in the form of vent openings in said machine.

2. An apparatus for continuously mixing and kneading dispersions of solid finely divided pigment, solid finely divided polymer binder and liquid dispersing agent, comprising:
   a. a hollow cylindrical casing with a rotatable and reciprocating shaft along the axis thereof, said shaft being fitted with worm blades for continuous mixing and kneading action;
   b. a first feeding means into said casing for feeding said polymer binder which includes conveying means within a hopper and a hollow shaft connecting the bottom of the hopper to an inlet opening in said hollow cylindrical casing, said conveying means providing continuous flow of polymer binder into said worm blades and said shaft providing a channel for de-aeration of said binder during mixing;
   c. a second feeding means into said casing at a location downstream of said first feeding means for feeding said liquid dispersing agent into the casing to be mixed with said binder by said rotating worm blades;
   d. a third feeding means into said casing at a location downstream of said second feeding means for conveying said pigment, including a slowly rotating worm conveyer, heating means for said worm conveyer, pigment feeding means at the inlet of said conveyer, a biconical hopper in communication with the outlet of said conveyer, and a drop chute fitted with a cover, the pigment discharging from said heated worm conveyer and flowing by gravity about the inner periphery of said drop chute and about the inner periphery of said biconical hopper with free space in the center of the hopper to permit exhaust gases to escape in the vertical direction opposite to the direction of the gravity flow of said pigment;
   e. a ventilating pipe which is coaxial with and within said drop chute in communication with the free space in said biconical hopper, said pipe projecting at its upper end through and above said cover of said drop chute to exhaust gases which are given off by the heated pigment, the slope of the biconical hopper being selected to permit free flow of heated pigment into the casing without plugging the opening between the bottom of the biconical hopper and the casing; and,
   f. degassing means adjacent the outlet of said conical hopper into said casing and downstream therefrom.

3. An apparatus as claimed in claim 2, wherein said conveying means constitutes blades attached to said hollow shaft and said hollow shaft is rotatable.

4. An apparatus as claimed in claim 3, wherein said blades are spaced wider apart near the top of said hollow shaft than near the bottom, whereby the blades near the top serve to loosen the binder and the blades near the bottom assure smooth and uniform conveying of the binder into the casing.

* * * * *